United States Patent [19]

Wennerberg et al.

[11] 4,082,694
[45] Apr. 4, 1978

[54] ACTIVE CARBON PROCESS AND COMPOSITION

[75] Inventors: Arnold N. Wennerberg, Chicago; Thomas M. O'Grady, Chicago Heights, both of Ill.

[73] Assignee: Standard Oil Company (Indiana), Chicago, Ill.

[21] Appl. No.: 696,634

[22] Filed: Jun. 16, 1976

Related U.S. Application Data

[63] Continuation-in-part of Ser. No. 644,095, Dec. 24, 1975, abandoned.

[51] Int. Cl.$^2$ .................. B01J 21/18; C01B 31/08; C01B 31/12
[52] U.S. Cl. .................. 252/444; 252/425; 423/445; 423/449
[58] Field of Search .............. 252/425, 447, 444, 445; 423/449

[56] References Cited

U.S. PATENT DOCUMENTS

| | | | |
|---|---|---|---|
| 3,764,561 | 10/1973 | Nishino | 252/447 |
| 3,817,874 | 6/1974 | Wennerberg et al. | 252/425 |
| 3,876,505 | 4/1975 | Stoneburner | 252/445 |
| 4,014,817 | 3/1977 | Johnson et al. | 252/445 |

FOREIGN PATENT DOCUMENTS 45-28301   9/1970   Japan .................. 252/425

*Primary Examiner*—Winston A. Douglas
*Assistant Examiner*—P. E. Konopka
*Attorney, Agent, or Firm*—Reed F. Riley; Arthur G. Gilkes; William T. McClain

[57] ABSTRACT

An improved process is disclosed whereby coal, coke or a combination thereof can be converted in good yield to a very high surface area active carbon with a unique and useful combination of properties, which carbons are particularly useful for water purification. Novel active carbons having a very high surface area which substantially have a cage-like structure exhibiting microporosity are disclosed.

6 Claims, 2 Drawing Figures

M1097.

|— 1400 Å —|

M1100.

|— 65 Å —|

1400 Å

65 Å

ACTIVE CARBON PROCESS AND COMPOSITION

RELATED APPLICATIONS

This application is a continuation-in-part of U.S. application Ser. No. 644,095, filed Dec. 24, 1975, now abandoned.

SUMMARY OF THE INVENTION

This invention relates to a process of producing an active carbon from carbonaceous material and the active carbon product produced thereby and, more particularly, to a staged temperature process for improving the yield and processability during manufacture of a novel, very high surface area active carbon substantially having a cage-like structure exhibiting microporosity, which carbon is of good bulk density and superior Total Organic Carbon Index.

In accordance with the instant invention, a feed of crushed coal, coal coke, petroleum coke or a mixture thereof is heated with agitation in the presence of a substantial weight ratio of hydrous potassium hydroxide at a first lower temperature to dehydrate the combination whereafter the temperature is raised to a second higher temperature to activate the combination and the result is then cooled and washed to remove inorganics to form a very high surface area active carbon substantially having a cage-like structure exhibiting microporosity, which carbon is of good bulk density and superior Total Organic Carbon Index.

BACKGROUND OF THE INVENTION

In U.S. Pat. No. 3,624,004 a process is disclosed whereby a pyrolyzate, which is made by heating above the salt decomposition temperature an aromatic acid and at least enough of an electrolyte, e.g., potassium hydroxide, to form a salt of the aromatic acid, is subjected to controlled oxidative activation above 1,300° F. in the presence of carbon dioxide to produce a high surface area, low bulk density active carbon.

In U.S. Pat. No. 3,642,657, processes are disclosed in which low surface area active carbons are made by decarboxylation of petroleum coke acids and such decarboxylated materials are further heated above about 1100° F. with a solute, for example potassium hydroxide, in the presence of a hydrogen halide, carbon monoxide or carbon dioxide, to form a high surface area, low bulk density active carbon.

In U.S. Pat. No. 3,817,874, a process is set out for increasing the surface area of a low to intermediate surface area active carbon by heating such carbon above about 1100° F. with sodium or potassium hydroxide in the presence of carbon dioxide. The process produces high surface area active carbons of moderate bulk density.

In U.S. Pat. No. 3,833,514, a process is set forth to produce high surface area active carbons by heating the salt of an aromatic acid admixed with electrolyte, e.g., potassium hydroxide, above the decomposition temperature of the salt. The process produces active carbons of low bulk density.

Although the active carbons produced in the above processes are of high effective surface area as measured by BET and of generally good properties several process and product deficiencies are noteworthy: (1) the processes are of less than maximum yield based upon carbonaceous feed consumed when the more economical hydrous alkali is used, (2) when coke acid carbonaceous feeds are used the total process requires extra processing steps, and (3) the feed combination of alkali and carbonaceous material during calcination forms a sticky, viscous mass which is very difficult to handle in commercial operations because of adhesion to the walls and plugging of the calcination (activation) vessel. The source of problems (1) and (3) when potassium hydroxide is employed appears to lie in use of the more economical hydrous alkali for continuous processes wherein spent carbon wash solutions are evaporated and treated to recover alkali for recycle purposes. More particularly, yield loss is thought due to oxidative attack by water vapor during high temperature calcination of the alkali-carbonaceous feed combination.

Further, the bulk density of the active carbon made from an aromatic acid or petroleum coke acid is lower than desirable for many commercial applications and the Total Organic Carbon Index per volume of carbon used, an important and industry recognized measure of the power of the active carbon to remove organics from water effluents, is far from maximized. Also, the effective BET surface area of such carbons while high is still not maximized.

Now, a higher yield process has been developed which uses hydrous potassium hydroxide and substantially eliminates the processing problems referred to above. Further, the process can produce a carbon with the unique combination of good bulk density, very high surface area and excellent Total Organic Carbon Index. The key to the new process is to carry out the heating of the hydrous alkali-carbonaceous feed combination in two steps wherein the first, lower temperature step is carried out with agitation and dehydrates the feed charge prior to the second, higher temperature activation step. The key to the new combination of product properties is the production of a carbon structure in which a substantially larger portion of the surface is substantially cage-like, which cage-like structure exhibits properties of microporosity.

SHORT DESCRIPTION OF THE DRAWING

SUMMARY OF THE INVENTION

Figure 1:
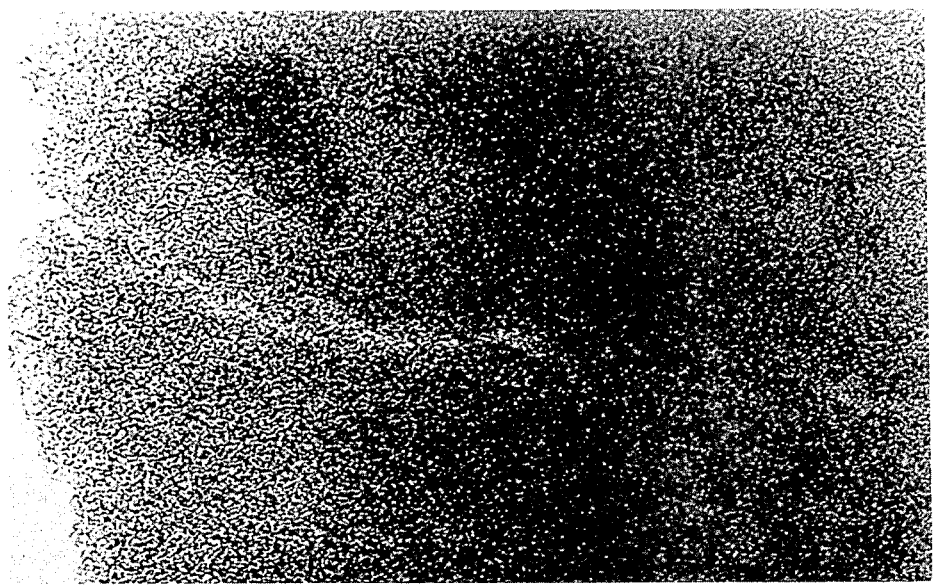
FIG. 1 shows a phase contrast, electron microscope photomicrograph of a carbon of this invention under low total magnification ($\times 142,000$).

The carbonaceous feeds for the instant invention are preferably coal, coal coke, petroleum coke or mixtures thereof. Such feeds are preferably utilized in a pulverized form, preferably less than about 10 mesh and, more preferably, below about 20 mesh.

The carbonaceous feeds generally contain about 1 to about 10 percent sulfur and about 3 to about 20 percent volatiles. Preferably, the volatiles and sulfur content are on the low side of the above figures to maximize the product yield and improve the efficiency of the alkali recycle but this is not critical and depends upon the feeds available.

Prior to processing, the carbonaceous feed is intimately mixed with solid or liquid, hydrous potassium hydroxide containing more than about 2 percent by weight water, preferably in powder or flake form. The lower limit of water content in the potassium hydroxide is set by the economics of removing water from the alkali prior to use and the upper limit of about 25 weight percent is set by the ease of handling the alkali and alkali-carbonaceous feed mixture during the precalcination step. More preferably, hydrous potassium hydroxide containing between about 5 and 15 weight percent water is used. The mesh size of the potassium hydroxide is not critical, but the alkali should disperse well with the particles of carbonaceous feed.

Preferably, the potassium hydroxide to carbonaceous feed ratio used is between about one-half and about 5 weights per weight and, more preferably, between about 2 and about 4 weights per weight. More preferably, it is between about 2½ to about 3½ weights potassium hydroxide per weight of carbonaceous feed.

The carbonaceous feed-potassium hydroxide combination is heated with agitation in the precalcination step in, preferably, an indirectly fired, rotary tube calciner equipped with rotating auger within a temperature range between about 600° F. and about 900° F. and, more preferably, between about 700° F. and about 750° F., preferably for times of about 15 minutes to 2 hours and, more preferably, about ½ to 1½ hours. The upper time limit is not critical and is generally set by economic considerations. What is desired in the precalcination step is sufficient heating time to substantially dehydrate the combination of feed and alkali and provide for substantially uniform reaction. By substantial dehydration is meant producing a solid product from the precalcination step containing no more than about two weight percent of water.

In general, at start-up the precalciner can contain an inert gas blanket of nitrogen, argon, etc., but once the operation is under way the gases present during precalcination are generally sufficient to maintain the inertness of the atmosphere necessary for maximum yield.

The product of the precalcination step is then fed generally without cooling or grinding, although either or both of these additional operations can be advantageous, into a second indirectly fired calciner heated to a temperature between about 1,300° F. and about 1,800° F. and, more preferably, between about 1,400° F. and 1,700° F. for about 20 minutes to about 4 hours, more preferably, about 30 minutes to about 2 hours. The upper time limit is not critical but too lengthy residence times in the calciner can decrease the yield of active carbon product. Preferably, an indirectly fired rotary calciner is used as agitation of the calciner mix is beneficial to operation of the process. It is important for good results in the calcination (activation) step to avoid fusion of the material contained in the calciner.

In general, the atmosphere in the rotary calciner should be inert for maximum yield and the gases present during reaction are sufficiently inert to reasonably accomplish the preferred conditions in the closed system preferred for use.

Thereafter, the calciner product, particularly if a high sulfur carbonaceous feed is used, is optimally desulfurized; for example, by the steam method set out in U.S. Pat. No. 3,726,808, the subject matter of which is incorporated herein by reference. The resulting product is then cooled, washed with water to remove inorganics and dried. In a continuous process it is desirable to reclaim and recycle the alkali by recausticization and evaporation of the spent wash liquid to form feed alkali.

Figure 2:
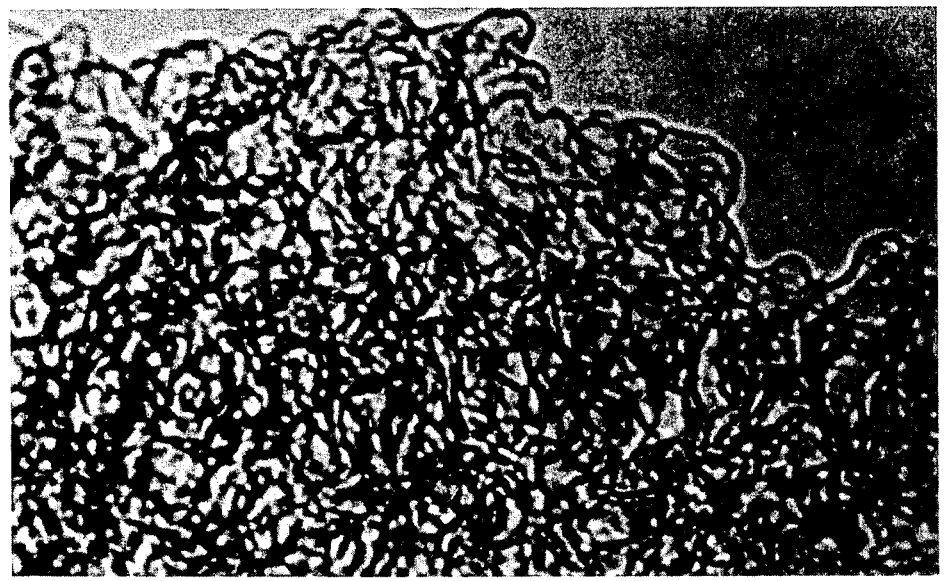
FIG. 2 shows a phase contrast, electron microscope photomicrograph of a carbon of this invention under high total magnification ($\times 3,116,000$).

The active carbon of the instant invention preferably has a cage-like structure which contributes to over sixty percent of its surface and, more preferably, over 80 percent of its surface and, most preferably, over 90 percent of the carbon surface as measured by phase contrast, high resolutions microscopy. This cage-like structure is characterized in that the individual cages are of a size that they exhibit properties of microporosity, i.e., essentially complete filling of the individual cages by the adsorbate at low effective concentration to give a large micropore volume. They are also substantially homogeneous in size (FIG. 1) as can be seen by low magnification image photomicrographs (e.g., ×142,000) taken by phase contrast, high resolution electron microscopy on a JEOL 100C electron microscope supplied by JEOL Ltd., Colindale, London, England. Using the same type of unit at high magnification (e.g., ×3,116,000) the individual cages are clearly evident and appear to be formed using single sheets of graphitic-type lamellae (FIG. 2). This cage-like structure is responsible for the multi-layer adsorption demonstrated by the carbons of this invention and the extremely large effective surface areas as measured by the BET method.

The active carbon product produced preferably has an effective BET surface area greater than about 2,300 square meters per gram and, more preferably, greater than about 2,700 square meters per gram and, most preferably, above about 3,000 square meters per gram. The active carbon preferably has a bulk density greater than about twenty-five hundredths grams per cubic centimeter and, more preferably greater than about twenty-seven hundredths grams per cubic centimeter and, most preferably, above about three-tenths grams per cubic centimeter. Futher, the product preferably has a Total Organic Carbon Index greater than about 300, more preferably, greater than about 500 and, most preferably, greater than about 700.

Typical property ranges of active carbon products which can be produced by the process of this invention are shown in the Table below.

TABLE

| Property | Starting Material Coke | Coal |
|---|---|---|
| Effective Surface Area, BET, square meters/gram | 3,000–4,000 | 1,800–3,000 |
| Iodine No. | 2,200–3,400 | 1,800–2,000 |
| Methylene Blue Adsorption, milligrams/grams | 300–600 | 400–500 |
| Phenol No. | 8–16 | 12–20 |
| Molasses No. | 30–70 | 100–150 |
| Total Organic Carbon Index (TOCI) | 300–1,000 | 300–1,000 |
| Major Pore Radius Range, angstroms* | 15–60 | —**** |
| Average Pore Radius, angstroms* | 20–30 | — |
| Bulk Density, grams/cubic centimeter | 0.25–0.4 | 0.24–0.4 |
| Ash, weight percent | 1.5 | 2–4 |
| Water Solubles, weight percent | 1 | 1 |
| pH | 7.5–8.5 | 7.5–8.5 |
| Adsorption Capacity ($CO_2$ at 195° K.; cc/gram)** | 0.9–2 | — |
| Cage dimensions, angstroms*** | 10–50 | — |

*Measured by nitrogen adsorption using a Digasorb 2500 unit made by Micromeritics, Norcross, Georgia
**Assumed density of $CO_2$ is 1 gram/cc.
***From image photomicrographs using a JEOL 100C electron microscope
****Not measured The active carbons of this invention are useful for all the uses that prior art active carbons have been used for including water treatment, gas and vapor adsorption, for example, carbon dioxide, methane, nitrous oxide, etc., decolorization, white wall tire compounding, etc. The carbons of this invention are regenerable by any method useful for carbon regeneration purposes.

While the invention is described in connection with the specific examples below, it is to be understood that these are for illustrative purposes only. Many alternatives, modifications and variations will be apparent to those skilled in the art in the light of the below examples and such alternatives, modifications and variations fall within the scope and spirit of the appended claims.

GENERAL EXPERIMENTAL PROCEDURE

The hydrous potassium hyroxide used contained approximately ten percent by weight water.

Phase contrast, high resolution electron microscopy was accomplished using a JEOL 100C electron microscope supplied by JEOL Ltd., Colindale, London, England.

DETERMINATION OF EFFECTIVE BET SURFACE AREA

Surface area measurements were accomplished employing the one point BET method using a 10 percent nitrogen-ninety percent helium mixture. The active carbon sample was pretreated at ambient for about 1 hour in a slow stream of the above gas mixture, then cooled to liquid nitrogen temperature for about 45 minutes for nitrogen adsorption and finally warmed to ambient and the composition of the desorbed gas measured with a thermal conductivity detector.

DETERMINATION OF TOTAL ORGANIC CARBON INDEX

Five separate samples of the active carbon to be determined are prepared having weights of 0.025 g., 0.05 g., 0.10 g., 0.15 g., and 0.25 g., respectively. Each sample is then stirred for 1 hour in contact with a 500 ml. aliquot of effluent (primary sewage effluents from Chicago Metropolitan Sanitary District and the City of Naperville, Ill.) after which the carbon is removed by filtration and the filtrate analyzed for total organic carbon (TOC) by the method set out in ASTM D 2579-74 to obtain the residual TOC.

The residual TOC of each of the filtrates is then subtracted from the TOC (similarly determined) of a 500 ml. portion of untreated effluent ($C_o$) and divided by the weight of the active carbon used to treat the particulate aliquot of filtrate to give TOC absorbed per gram of carbon (PPM/g.) values. The residual TOC values are then plotted versus the PPM/g. values on a log-log scale and the resulting curve extrapolated to a value of residual TOC equal to $C_o$ and the corresponding value of the PPM/g. determined. This value, termed the TOC isotherm value, is then divided by the TOC isotherm value for a standard active carbon (Aqua Nuchar purchased from Westvaco Inc., Covington, Va.) and multiplied by 100. The resulting number is the TOCI. See H. J. Forwalt and R. A. Hutchins, Chemical Engineering, Apr. 11, 1966 edition.

DETERMINATION OF BULK DENSITY

Two grams of active carbon product was added to a 25 milliliter graduated cylinder and the bottom of the cylinder gently tapped against a wooden surface for 10 minutes. This time was found adequate to give no further change in volume of the carbon.

DETERMINATION OF THE PHENOL NUMBER

Phenol No. was determined by the method set out in A.W.W.A. 3600-66, 4.7.2.

DETERMINATION OF MOLASSES NUMBER INDEX

The molasses number index was determined by measuring the molasses number of filtered corn syrup molasses of a Darco S-51 reference sample supplied by ICI America, N.Y., N.Y., and assigning it a value of 100. Molasses number index then is the molasses number of a carbon of this invention compared to the molasses number of Darco S-51 assumed to be 100. To determine molasses number, a plot of grams adsorbed per gram of carbon versus percent adsorbed was made based upon tests using several weights of carbon and the same total amount of adsorbate and the molasses number determined as grams adsorbed per gram of carbon at ninety percent reduction in original solution concentration of adsorbate.

EXAMPLE I

Sugar Creek, Mo., refinery petroleum coke containing about 9.7 percent volatiles and 4.9 percent sulfur crushed to a mesh size of about 40 was utilized in this Example. A 3/1 KOH to coke ratio was used. The rotary precalciner equipped with counter rotating auger was held at about 725° F. and the average residence time in the precalciner was about 1 hour. The rotary calciner was held at about 1550° F. and the average residence time in the calciner was about 2 hours. The cooled product was washed with water and dried at 110° C. in a vacuum oven. Properties of the active carbon product after washing out inorganics and drying are given in the Table below.

TABLE

| | |
|---|---|
| Yield | 60–65 percent |
| Bulk Density | 0.3 grams/cubic centimeter |
| Effective Surface Area, BET | 3,600–3,900 square meters/gram |
| Total Organic Carbon Index | 400–800 |
| Methylene Blue Adsorption | 500–550 milligrams/gram |
| Phenol No. | 10–12 |

COMPARATIVE EXAMPLE II

The crushed petroleum coke used in this Example was the same as employed in Example I. A 3/1 KOH to coke ratio was used. The calciner was held at about 1400° F. (higher temperature was not able to be used because of plugging and sticking problems) and the average heating time of the several batch runs composing this Example varied between 24 and 48 minutes. The cooled product was washed with water and dried at 110° C. in a vacuum oven. The properties of the active carbon product are shown in the Table below.

TABLE

| | |
|---|---|
| Yield | 55–58 percent |
| Bulk Density | 0.375 grams/cubic centimeter |
| Effective Surface Area, BET | 3,900 square meters/gram |
| Total Organic Carbon Index | 170 |
| Iodine Number | 2,900 |
| Phenol Number | 12.5 |
| Molasses Number Index | 3 |
| Methylene Blue Adsorption | 392 milligrams/gram |

EXAMPLE III

This Example shows the effect of residence time in the calciner upon certain carbon product properties. The precalcination was effected at about 725° F. with a residence time of about one hour with a petroleum coke feed of mesh size about 60 to 100. A 3/1 KOH to coke ratio was employed. The cooled product was washed with water and dried at 110° C. in a vacuum oven. The results are given in Table below.

TABLE at a calciner temperature of 1450° F.

| Calciner Residence Time (minutes) | Effective BET Surface Area (m²/gram) | TOCI | Bulk Dens. (grams/cc) | Yield (%) |
|---|---|---|---|---|
| 10 | 3482 | 110 | 0.37 | 61.5 |
| 30 | 3733 | 235–750 | 0.35 | 59.5 |
| 60 | 3350 | 430–550 | 0.34 | 59.0 |
| 120 | 3736 | 570–1240 | 0.35 | 58.6 | at a calciner temperature of 1550° F.

| | | | | |
|---|---|---|---|---|
| 10 | 3996 | 910 | 0.32 | 58.6 |
| 30 | 4057 | 910 | 0.32 | 58.6 |
| 60 | 3821 | 1620 | 0.33 | 57.7 |
| 120 | 3748 | 760 | 0.32 | 57.7 |

EXAMPLE IV

Illinois No. 6 Coal was crushed to a mesh size between 60 and 100 and precalcined in a 3/1 KOH to coal mixture. The precalcinator temperature was 725° F. and a precalciner residence time of about 1 hour was used. The calciner temperature was about 1750° F. with a holding time of 2 hours. The cooled product was washed with water and dried at 110° C. in a vacuum oven.

TABLE

| | |
|---|---|
| Yield | 48–52 percent |
| Bulk Density | 0.24 grams/cubic centimeter |
| Effective Surface Area, BET | 2,580 square meters/gram |
| Total Organic Carbon Index | 550 |
| Molasses No. Index | 110–120 |

EXAMPLE V

Illinois No. 6 Coal was crushed to a mesh size between 60 and 100, mixed with Sugar Creek Refinery petroleum coke containing about 10 to 12 percent-volatiles and precalcined between 700° F. and 900° F. in a 3/0.25/0.75 KOH/Coal/Coke weight ratio for 1 hour. The calciner holding time was 2 hours and calciner temperature varied as recorded in the Table below. Some properties of the active carbons produced are also set forth in the Table.

TABLE

| Calciner Temperature (° F.) | Effective BET Surface Area (m²/gram) | Bulk Density (grams/ml.) | Molasses Number Index | TOCI | Iodine No. |
|---|---|---|---|---|---|
| 1,450 | 3,753 | 0.315 | 32 | 1,300 | |
| 1,550 | 2,745 | 0.283 | 79 | 500 | 2,776 |
| 1,550 | 3,586 | 0.315 | 39 | 320 | |
| 1,650 | 3,658 | 0.257 | 165 | 750 | |

EXAMPLE VI

Sugar Creek, Missouri, refinery petroleum coke containing about 10 percent volatiles and 5 percent sulfur was crushed to a mesh size of 40, mixed with a 3/1 weight ratio of KOH to coke and precalcined at 725° F. for 0.7 hours. It was thereafter calcined at 1,550° F. for 1½ hours. The cooled product was washed with water and dried. Properties of the product are set forth in the Table below. Photomicrographs of the material are shown in the Drawing.

TABLE

| | |
|---|---|
| Effective surface area, BET | 3,704 square meters/gram |
| Iodine Number | 3,226 |
| Methylene Blue Adsorbtion | 550 milligrams/gram |
| Bulk Density | 0.313 grams/cubic centimeter |
| Phenol Number | 9.7 |
| Total Organic Carbon Index | 1,500 |
| Molasses Number Index | 3 |

What is claimed is:

1. A process consisting essentially of:
   a. substantially dehydrating an agitated combination of solid potassium hydroxide containing between about 2 and about 25 weight percent water and a carbonaceous material comprising coal coke, petroleum coke or a mixture thereof by heating said combination in a weight ratio said hydroxide to said substance between about ½ to 1 and 5 to 1 below about 900° F.;
   b. activating the product of (a) by heating between about 1,300° F. and about 1,800° F.; and
   c. cooling the product of (b) and removing essentially all the inorganic material therefrom by water washing to form a high surface area active carbon.

2. The process of claim 1 wherein said carbonaceous material is coal coke.

3. The process of claim 1 wherein said carbonaceous material is petroleum coke.

4. Active carbon derived from a carbonaceous material comprising coal coke, petroleum coke or mixture thereof having a cage-like structure exhibiting microporosity which contributes to over 60 percent of its surface and which has an effective BET surface area of greater than about 2,300 square meters per gram and a bulk density greater than about twenty-five hundredths grams per cubic centimeter.

5. Active carbon derived from a carbonaceous material comprising coal coke, petroleum coke or mixtures thereof having a cage-like structure exhibiting microporosity which contributes to over 80 percent of its surface and which has an effective BET surface area of greater than about 2,700 square meters per gram and a bulk density greater than about twenty-five hundredths grams per cubic centimeter.

6. Active carbon derived from a carbonaceous material comprising coal coke, petroleum coke or mixtures thereof having a cage-like structure exhibiting microporosity which contributes to over 90 percent of its surface and which has an effective BET surface area of greater than about 3,000 square meters per gram and a bulk density of greater than about twenty-five hundredths grams per cubic centimeter.

* * * * *

UNITED STATES PATENT OFFICE
CERTIFICATE OF CORRECTION

Patent No. 4,082,694　　　　　　　　　　　Dated　April 4, 1978

Inventor(s) Arnold N. Wennerberg and Thomas M. O'Grady

It is certified that error appears in the above-identified patent and that said Letters Patent are hereby corrected as shown below:

Col. 7, Line 20 - "precalcinator" should be --precalciner--

Col. 8, Line 20 - "comprising coal" should be -- comprising: coal --

Col. 8, Line 23 - "said substance" should be -- said material --

Signed and Sealed this

*Twenty-sixth* Day of *December 1978*

[SEAL]

*Attest:*

RUTH C. MASON
*Attesting Officer*

DONALD W. BANNER
*Commissioner of Patents and Trademarks*